(12) United States Patent
Hsu et al.

(10) Patent No.: US 8,488,607 B2
(45) Date of Patent: Jul. 16, 2013

(54) METHOD FOR WLAN LINK AGGREGATION AND SYSTEM FOR USING THE SAME

(75) Inventors: Chia Hsiang Hsu, Hsinchu County (TW); Tsung Yuan Pan, Hsinchu County (TW)

(73) Assignee: Ralink Technology Corporation, Jhubei, Hsinchu County (TW)

( * ) Notice: Subject to any disclaimer, the term of this patent is extended or adjusted under 35 U.S.C. 154(b) by 140 days.

(21) Appl. No.: 12/882,909

(22) Filed: Sep. 15, 2010

(65) Prior Publication Data

US 2011/0064080 A1    Mar. 17, 2011

(30) Foreign Application Priority Data

Sep. 16, 2009   (TW) .............................. 98131164 A

(51) Int. Cl.
*H04L 12/28* (2006.01)
*H04L 12/56* (2006.01)

(52) U.S. Cl.
USPC ........................................................ 370/392

(58) Field of Classification Search
USPC ........................................................ 370/392
See application file for complete search history.

(56) References Cited

U.S. PATENT DOCUMENTS

| | | | |
|---|---|---|---|
| 6,647,008 B1 * | 11/2003 | Galand et al. ................ | 370/389 |
| 7,099,654 B1 | 8/2006 | Tewfik | |
| 7,733,844 B2 * | 6/2010 | Kito et al. ................... | 370/351 |
| 7,920,555 B2 * | 4/2011 | Carvey et al. ............... | 370/357 |
| 7,957,358 B2 | 6/2011 | Chi et al. | |
| 2007/0171814 A1 | 7/2007 | Florit et al. | |
| 2011/0040888 A1 * | 2/2011 | Krishnaswamy et al. .... | 709/231 |

FOREIGN PATENT DOCUMENTS

TW          200824365          6/2008

OTHER PUBLICATIONS

IEEE 802.11 WG, "Reference No. ISO/IEC 8802-11: 1999(E) IEEE Std 802.11, 1999 edition. International Standard [for] Information Technology-Telecommunications and information exchange between systems—local and metropolitan area networks—specific requirements—Part 11: Wireless LAN Medium Access Control (MAC) and Physical Layer (PHY) specifications," 1999.

* cited by examiner

*Primary Examiner* — Ayaz Sheikh
*Assistant Examiner* — Blanche Wong
(74) *Attorney, Agent, or Firm* — Hamre, Schumann, Mueller & Larson, P.C.

(57) ABSTRACT

A system with WLAN link aggregation comprises an access point, a station and a remote host. The station is equipped with a first network interface unit and a second network interface unit. The first network interface unit and the second network interface unit are configured to forward packets to or receive packets from the access point. After receiving packets from the first network interface unit, the second network interface unit or the remote host, the access point modifies headers of the packets and forwards the packets to the first network interface unit, the second network interface unit or the remote host.

21 Claims, 12 Drawing Sheets

| Address 1 | Address 2 | Address 3 | Address 4 |
|---|---|---|---|
| BSSID of AP | MAC address of second network interface unit | MAC address of remote host | MAC address of first network interface unit |
| 301 | 302 | 303 | 304 |

FIG. 3

| Address 1 | Address 2 |
|---|---|
| MAC address of remote host | MAC address of first network interface unit |

401 — Address 1
402 — Address 2

FIG. 4

| Address 1 | Address 2 | Address 3 |
|---|---|---|
| MAC address of remote host | BSSID of AP | MAC address of first network interface unit |
| 501 | 502 | 503 |

FIG. 5

| Address 1 | Address 2 |
|---|---|
| MAC address of first network interface unit | MAC address of remote host |

601 — Address 1; 602 — Address 2

FIG. 6

| Address 1 | Address 2 | Address 3 |
|---|---|---|
| BSSID of AP | MAC address of remote host | MAC address of first network interface unit |
| 701 | 702 | 703 |

FIG. 7

| Address 1 | Address 2 | Address 3 |
|---|---|---|
| MAC address of first network interface unit | BSSID of AP | MAC address of remote host |
| 801 | 802 | 803 |

FIG. 8

| Address 1 | Address 2 | Address 3 | Address 4 |
|---|---|---|---|
| MAC address of second network interface unit | BSSID of AP | MAC address of first network interface unit | MAC address of remote host |
| 901 | 902 | 903 | 904 |

FIG. 9

METHOD FOR WLAN LINK AGGREGATION AND SYSTEM FOR USING THE SAME

BACKGROUND OF THE INVENTION

1. Field of the Invention

The present invention relates to a communication system, and more particularly, to a method and system for wireless local area network (WLAN) link aggregation.

2. Description of the Related Art

WLAN technology is now widely used in various applications. Numerous organizations devote extensive resources seeking for improvements in WLAN data communication quality. Traditional wireless networks, e.g., those complying with the IEEE 802.11 standard, use distributed coordination function (DCF) to control accesses of shared wireless media. The DCF standard regulates that when all wireless media are busy, all devices intending to access the wireless media have to wait for an idle period. However, as immediate access for real-time applications becomes increasingly important, the issue of quality of service (QoS) becomes increasingly important as well.

The Wi-Fi Group has also developed a standard, called Wi-Fi Multimedia (WMM). This standard classifies the transmission signals into four classes, listed in descending order of priority: voice, image, best effort and background. The DCF standard is further modified as enhanced distributed coordination function (EDCF), which allocates idle periods for the four different signal priorities. According to this standard, items of higher priority should have less idle time and higher probability of accessing the wireless network. In addition, providing an increased bandwidth for data transmission is another way to improve the transmission quality of a wireless network.

SUMMARY OF THE INVENTION

The system and method for WLAN link aggregation utilize different network interface units of a station to forward packets to an AP. After receiving packets, the AP modifies headers of the packets and forwards the packets to a remote host. In addition, after receiving packets from the remote host, the AP modifies headers of the packets and forwards the packets to the different network interface units of a station.

One embodiment of the present invention discloses a system for WLAN link aggregation, comprising an access point, a station and a remote to host. The access point is utilized for modifying a first type packet to form a third type packet and forwarding the third type packet, modifying a second type packet to form a fourth type packet and forwarding the fourth type packet, modifying a fifth type packet to form a sixth type packet or a seventh type packet and forwarding the sixth type packet and the seventh type packet, wherein contents of frame bodies of the first type packet and the third type packet are the same, contents of frame bodies of the second type packet and the fourth type packet are the same, and contents of frame bodies of the fifth type packet, the sixth type packet and the seventh type packet are the same. The station is equipped with a first network interface unit and a second network interface unit, wherein the first network interface unit is utilized for forwarding the first type packet to the access point and receiving the sixth type packet forwarded by the access point, and the second network interface unit is utilized for forwarding the second type packet to the access point and receiving the seventh type packet forwarded by the access point. The remote host is utilized for receiving the third type packet and the fourth type packet forwarded by the access point and forwarding the fifth type packet to the access point.

Another embodiment of the present invention discloses a method for WLAN link aggregation, comprising the steps of: forwarding a first type packet to an access point through a first network interface unit of a station; forwarding a second type packet to the access point through a second network interface unit of the station; modifying the header of the first type packet by the station to form a third type packet, and forwarding the third type packet to a remote host, wherein contents of frame bodies of the first type packet and the third type packet are the same; and modifying the header of the second type packet by the access point to form a fourth type packet, and forwarding the fourth type packet to the remote host, wherein contents of frame bodies of the second type packet and the fourth type packet are the same.

BRIEF DESCRIPTION OF THE DRAWINGS

The invention will be described according to the appended drawings in which:

FIG. 3 shows another content of a header;

FIG. 4 shows another content of a header;

FIG. 5 shows another content of a header;

FIG. 6 shows another content of a header;

FIG. 7 shows another content of a header;

FIG. 8 shows another content of a header;

FIG. 9 shows another content of a header; and

PREFERRED EMBODIMENT OF THE PRESENT INVENTION

Figure 1:
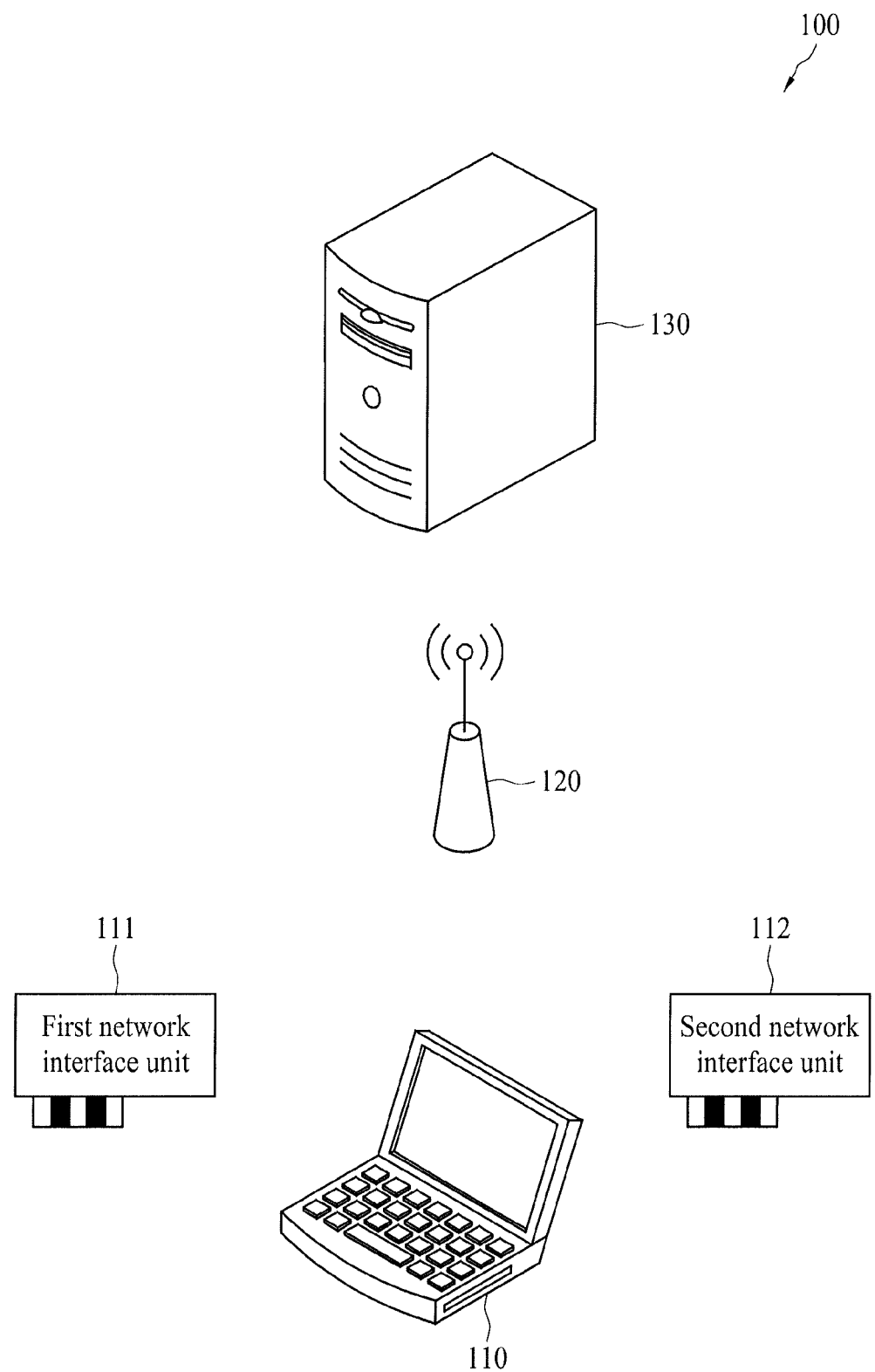
FIG. 1 shows a system for WLAN link aggregation in accordance with an embodiment of the present invention.
Figure 2:
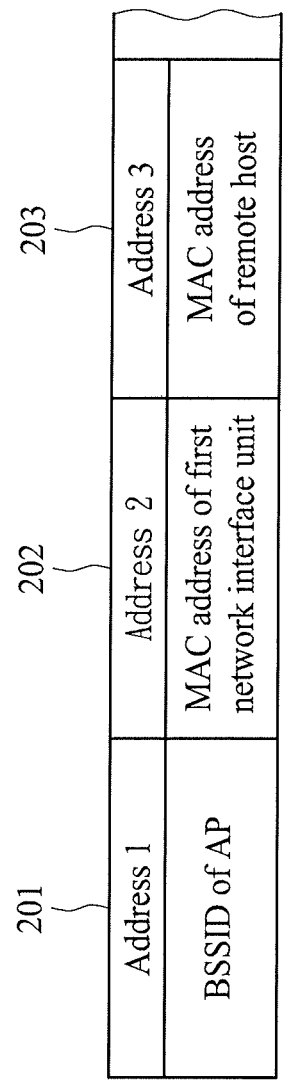
FIG. 2 shows a content of a header.
Figure 12:
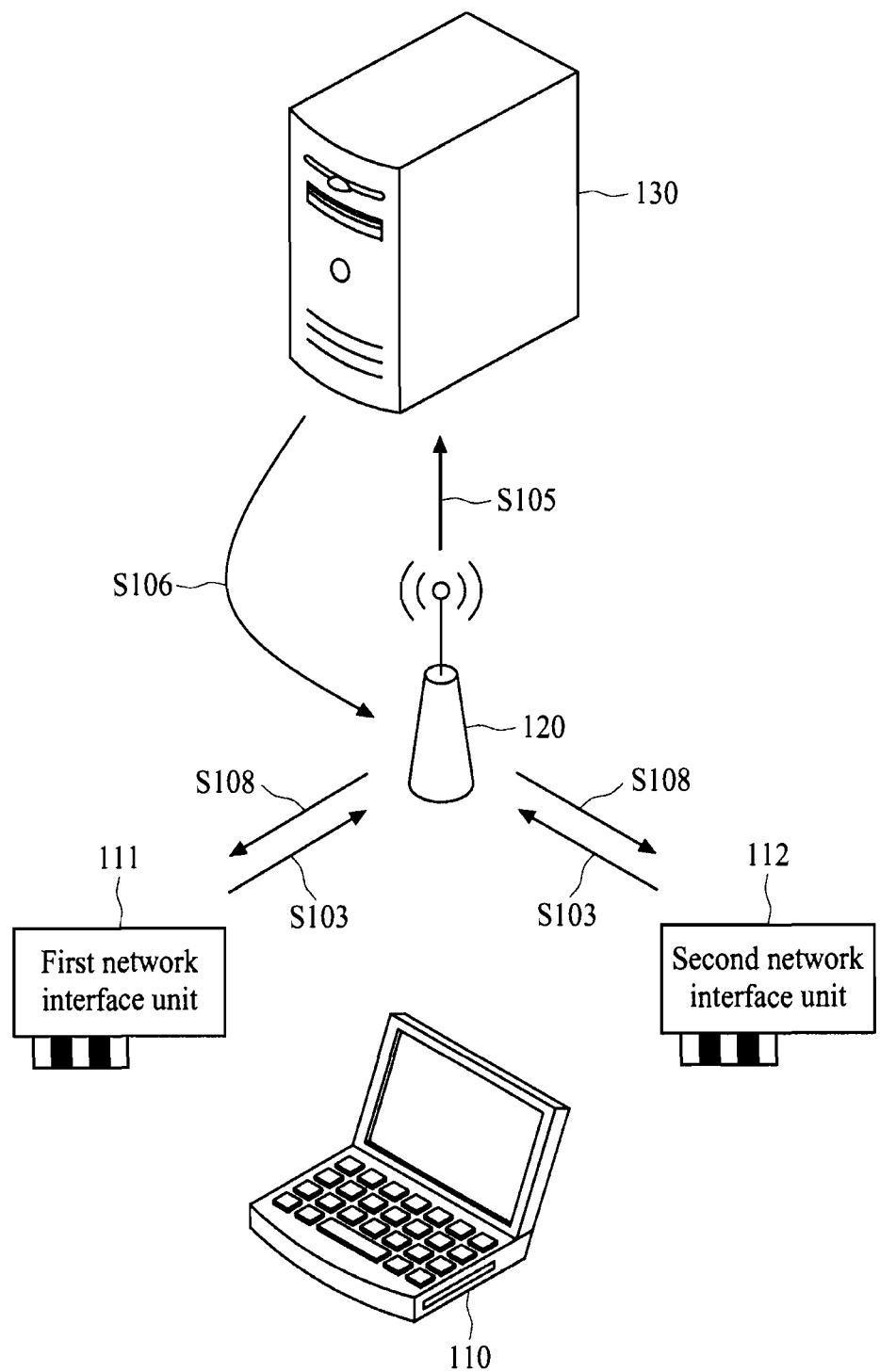
FIG. 12 illustrates a more detailed system of the system 100 as shown in FIG. 1.

FIG. 1 shows a system for WLAN link aggregation in accordance with an embodiment of the present invention. FIG. 12 illustrates a more detailed system of the system 100 as shown in FIG. 1. The system 100 for WLAN link aggregation comprises a station 110, an access point (AP) 120 and a remote host 130. The AP 120 supports an aggregation mode. The spanning tree protocol (STP) learning function of the AP 120 is disabled. In accordance with an embodiment of the present invention, the station 110 is equipped with a first network interface unit 111 and a second network interface unit 112. The first network interface unit 111 and the second network interface unit 112 are utilized for forwarding packets to the AP 120 and receiving packets from the AP 120. The first network interface unit 111 is utilized for forwarding a first type packet to the AP 120. A content of a header of the first type packet is shown in FIG. 2. An address 1 field 201, an address 2 field 202 and an address 3 field 203 in the header of the first type packet comprise, respectively, a service set identifier (SSID) of the AP 120, a media access control (MAC) address of the first network interface unit 111 and a MAC address of the remote host 130. The second network interface unit 112 is utilized for forwarding a second type packet to the AP 120. The second type packet is a wireless distributed system packet. A content of a header of the second type packet is shown in FIG. 3. An address 1 field 301, an address 2 field 302, an address 3 field 303 and an address 4 field 304 in the header of the first type packet comprise, respectively, the SSID of the AP 120, a MAC address of the second network interface unit 112, the MAC address of the remote host 130 and the MAC address of the first network interface unit 111.

The AP 120 is utilized for modifying the first type packet to form a third type packet and then forwarding the third type packet to the remote host 130, wherein contents of frame bodies of the first type packet and the third type packet are the same. The AP 120 is also utilized for modifying the second type packet to form a fourth type packet and then forwarding the fourth type packet to the remote host 130, wherein contents of frame bodies of the second type packet and the fourth type packet are the same. In accordance with an embodiment of the present invention, the third type packet and the fourth type packet are forwarded through an Ethernet network. A content of a header of the third type packet or the fourth type packet is shown in FIG. 4. An address 1 field 401 and an address 2 field 402 in the header of the third type packet or in the header of the fourth type packet comprise, respectively, the MAC address of the remote host 130 and the MAC address of the first network interface unit 111. A content of a header of the third type packet or the fourth type packet, when said third type packet or fourth type packet is forwarded through a wireless network, is shown in FIG. 5. An address 1 field 501, an address 2 field 502 and an address 3 field 503 in the header of the third type packet or in the header of the fourth type packet comprise, respectively, the MAC address of the remote host 130, the BSSID of the AP 120 and the MAC address of the first network interface unit 111.

The remote host 130 is utilized for receiving the third type packet and the fourth type packet forwarded by the AP 120, and forwarding the fifth type packet to the AP 120. In accordance with an embodiment of the present invention, a content of a header of the fifth type packet, when said fifth type packet is forwarded through an Ethernet network, is shown in FIG. 6. An address 1 field 601 and an address 2 field 602 in the header of the fifth type packet comprise, respectively, the MAC address of the first network interface unit 111 and the MAC address of the remote host 130. A content of a header of the fifth type packet, when said fifth type packet is forwarded through a wireless network, is shown in FIG. 7. An address 1 field 701, an address 2 field 702 and an address 3 field 703 in the header of the fifth type packet comprise, respectively, the BSSID of the AP 120, the MAC address of the remote host 130 and the MAC address of the first network interface unit 111.

After receiving the fifth type packet, the AP 120 modifies the fifth type packet to form a sixth type packet or a seventh type packet, and forwards the sixth type packet to the first network interface unit 111 or forwards the seventh type packet to the second network interface unit 112. The seventh type packet is a wireless distributed system packet. Contents of frame bodies of the above-mentioned fifth type packet, sixth type packet and seventh type packet are the same. In accordance with an embodiment of the present invention, a content of a header of the sixth type packet is shown in FIG. 8. An address 1 field 801, an address 2 field 802 and an address 3 field 803 in the header of the sixth type packet comprise, respectively, the MAC address of the first network interface unit 111, the BSSID of the AP 120 and the MAC address of the remote host 130. A content of a header of the seventh type packet is shown in FIG. 9. An address 1 field 901, an address 2 field 902, an address 3 field 903 and an address 4 field 904 in the header of the seventh type packet comprise, respectively, the MAC address of the second network interface unit 112, the BSSID of the AP 120, the MAC address of the first network interface unit 111 and the MAC address of the remote host 130.

Figure 10:
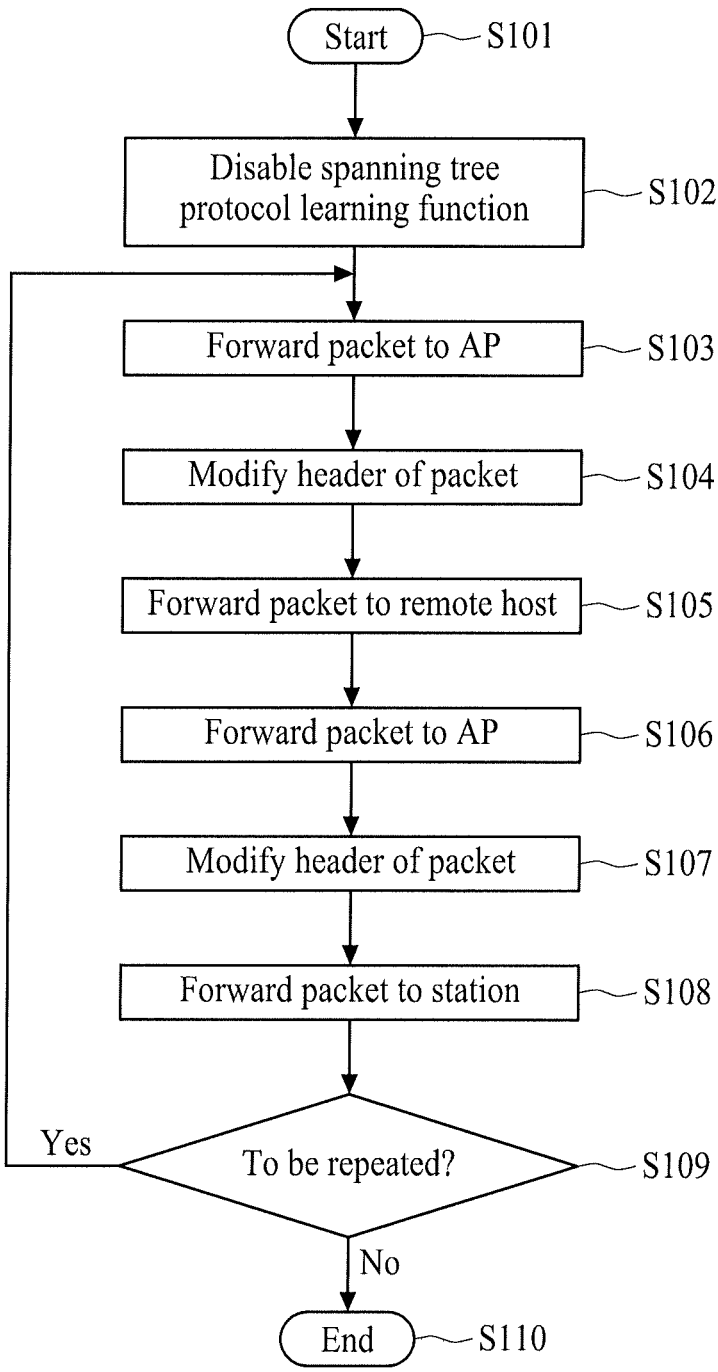
FIG. 10 illustrates a flowchart of a method for WLAN link aggregation in accordance with another embodiment of the present invention.
Figure 11:
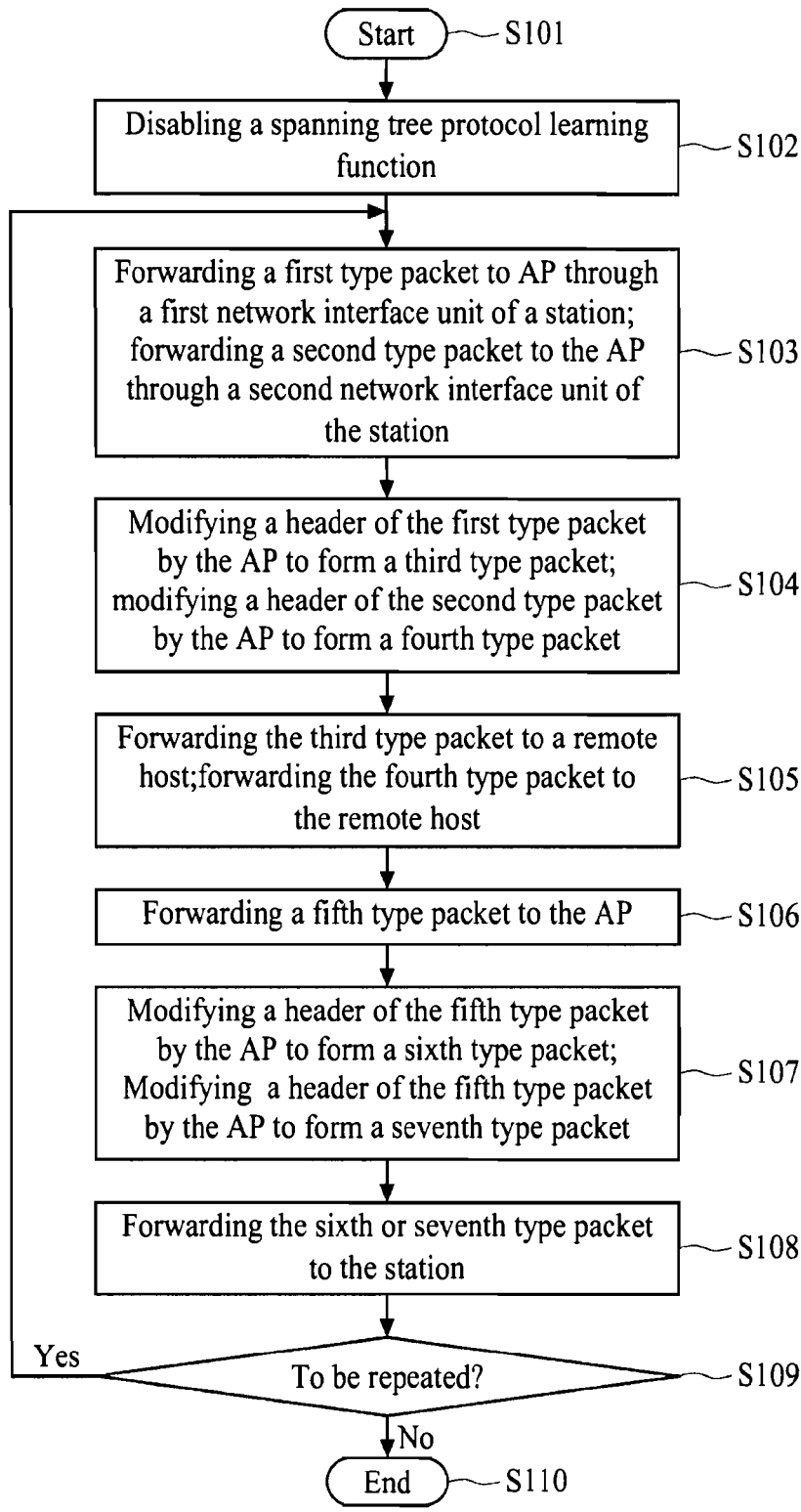
FIG. 11 is a more detailed flowchart of the method of FIG. 10.

FIG. 10 is a flowchart of a method for WLAN link aggregation in accordance with another exemplary embodiment of the present invention. FIG. 11 is a more detailed flowchart of the method of FIG. 10. In order to enable those skilled in the art to practice the present invention in accordance with the exemplary embodiment, FIGS. 1-10 are utilized to describe a procedure of the method for WLAN link aggregation.

In step S101, the procedure of the embodiment is activated. In step S102, the spanning tree protocol (STP) learning function of an access point (AP) 120 supporting an aggregation mode is disabled. In step S103, a first type packet is forwarded to the AP 120 through a first network interface unit 111 of a station 110, or a second type packet is forwarded to the AP 120 through a second network interface unit 111 of the station 110. In accordance with an exemplary embodiment of the present invention, a content of a header of the first type packet is shown in FIG. 2. An address 1 field 201, an address 2 field 202 and an address 3 field 203 in the header of the first type packet comprise, respectively, a service set identifier (SSID) of the AP 120, a media access control (MAC) address of the first network interface unit 111 and a MAC address of a remote host 130. The second type packet is a wireless distributed system packet. A content of a header of the second type packet is shown in FIG. 3. An address 1 field 301, an address 2 field 302, an address 3 field 303 and an address 4 field 304 in the header of the first type packet comprise, respectively, the SSID of the AP 120, a MAC address of the second network interface unit 112, the MAC address of the remote host 130 and the MAC address of the first network interface unit 111.

In step S104, the AP 120 is utilized for modifying the first type packet to form a third type packet or modifying the second type packet to form a fourth type packet. Contents of frame bodies of the first type packet and the third type packet are the same. Contents of frame bodies of the second type packet and the fourth type packet are the same. In accordance with an embodiment of the present invention, a content of a header of the third type packet or the fourth type packet, when such third type packet or fourth type packet is forwarded through an Ethernet network, is shown in FIG. 4. An address 1 field 401 and an address 2 field 402 in the header of the third type packet or in the header of the fourth type packet comprise, respectively, the MAC address of the remote host 130 and the MAC address of the first network interface unit 111. A content of a header of the third type packet or the fourth type packet, when such third type packet or fourth type packet is forwarded through a wireless network, is shown in FIG. 5. An address 1 field 501, an address 2 field 502 and an address 3 field 503 in the header of the third type packet or in the header of the fourth type packet comprise, respectively, the MAC address of the remote host 130, the BSSID of the AP 120 and the MAC address of the first network interface unit 111. In step S105, the AP 120 is utilized for forwarding the third type packet to the remote host 130, or forwarding the fourth type packet to the remote host 130.

In step S106, the AP 120 is utilized for forwarding the fifth type packet to the AP 120. In accordance with an embodiment of the present invention, a content of a header of the fifth type packet, when such fifth type packet is forwarded through an Ethernet network, is shown in FIG. 6. An address 1 field 601 and an address 2 field 602 in the header of the fifth type packet comprise, respectively, the MAC address of the first network interface unit 111 and the MAC address of the remote host 130. A content of a header of the fifth type packet, when such fifth type packet is forwarded through a wireless network, is shown in FIG. 7. An address 1 field 701, an address 2 field 702 and an address 3 field 703 in the header of the fifth type packet comprise, respectively, the BSSID of the AP 120, the MAC address of the remote host 130 and the MAC address of the first network interface unit 111.

In step S107, the AP 120 is utilized for modifying the fifth type packet to form a sixth type packet or modifying the fifth type packet to form a seventh type packet. The seventh type packet is a wireless distributed system packet. In accordance with an embodiment of the present invention, a content of a header of the sixth type packet is shown in FIG. 8. An address 1 field 801, an address 2 field 802 and an address 3 field 803 in the header of the sixth type packet comprise, respectively, the MAC address of the first network interface unit 111, the BSSID of the AP 120 and the MAC address of the remote host 130. A content of a header of the seventh type packet is shown in FIG. 9. An address 1 field 901, an address 2 field 902, an address 3 field 903 and an address 4 field 904 in the header of the seventh type packet comprise, respectively, the MAC address of the second network interface unit 112, the BSSID of the AP 120, the MAC address of the first network interface unit 111 and the MAC address of the remote host 130. Contents of frame bodies of the above-mentioned fifth type packet, sixth type packet and seventh type packet are the same.

In step S108, the sixth type packet is forwarded to the first network interface unit 111 of the station 110, or the seventh type packet is forwarded to the second network interface unit 112 of the station 110. Step S109 determines whether the procedure of the method for WLAN link aggregation is to be repeated. If YES, steps S103-S109 are repeated. If NO, the procedure is ended in step S110.

The system and method for WLAN link aggregation utilize different network interface units of a station to forward packets to an AP. After receiving packets, the AP modifies headers of the packets and forwards the packets to a remote host. In addition, after receiving packets from the remote host, the AP modifies headers of the packets and forwards the packets to the different network interface units of a station, so as to provide increased bandwidth for data transmission.

The above-described embodiments of the present invention are to intended to be illustrative only. Numerous alternative embodiments may be devised by persons skilled in the art without departing from the scope of the following claims.

What is claimed is:

1. A method for wireless local area network (WLAN) link aggregation, comprising:
   forwarding a first type packet to an access point through a first network interface unit of a station;
   forwarding a second type packet to the access point through a second network interface unit of the station;
   modifying a header of the first type packet by the access point to form a third type packet, and forwarding the third type packet to a remote host; and
   modifying a header of the second type packet by the access point to form a fourth type packet, and forwarding the fourth type packet to the remote host.

2. The method of claim 1, wherein the access point supports an aggregation mode.

3. The method of claim 2, further comprising disabling a spanning tree protocol learning function of the access point.

4. The method of claim 1, further comprising forwarding a fifth type packet by the remote host to the access point.

5. The method of claim 4, further comprising modifying a header of the fifth type packet by the access point to form a sixth type packet, and forwarding the sixth type packet to the first network interface unit.

6. The method of claim 4, further comprising modifying a header of the fifth type packet by the access point to form a seventh type packet, and forwarding the seventh type packet to the second network interface unit.

7. The method of claim 6, wherein the seventh type packet is a wireless distributed system packet.

8. The method of claim 1, wherein the second type packet is a wireless distributed system packet.

9. The method of claim 1, wherein a header of the first type packet comprises a basic service set identifier of the access point, a media access control address of the first network interface unit and a media access control address of the remote host.

10. The method of claim 1, wherein a header of the second type packet comprises a basic service set identifier of the access point, a media access control address of the second network interface unit, a media access control address of the remote host and a media access control address of the first network interface unit.

11. The method of claim 1, wherein the third type packet and the fourth type packet are forwarded to the remote host through an Ethernet network.

12. The method of claim 11, wherein headers of the third type packet and the fourth type packet comprise, respectively, a media access control address of the remote host and a media access control address of the first network interface unit.

13. The method of claim 1, wherein the third type packet and the fourth type packet are forwarded to the remote host through a wireless network.

14. The method of claim 13, wherein headers of the third type packet and the fourth type packet comprise, respectively, a media access control address of the remote host, a basic service set identifier of the access point and a media access control address of the first network interface unit.

15. The method of claim 4, wherein the fifth type packet is forwarded to the access point through an Ethernet network.

16. The method of claim 15, wherein a header of the fifth type packet comprises a media access control address of the first network interface unit and a media access control address of the remote host.

17. The method of claim 4, wherein the fifth type packet is forwarded to the access point through a wireless network.

18. The method of claim 17, wherein a header of the fifth type packet comprises a basic service set identifier of the access point, a media access control address of the remote host and a media access control address of the first network interface unit.

19. The method of claim 5, wherein a header of the sixth type packet comprises a media access control address of the first network interface unit, a basic service set identifier of the access point and a media access control address of the remote host.

20. The method of claim 6, wherein a header of the seventh type packet comprises a media access control address of the second network interface unit, a basic service set identifier of the access point, a media access control address of the first network interface unit and a media access control address of the remote host.

21. A system for wireless local area network (WLAN) link aggregation, comprising:
   an access point for modifying a header of a first type packet to form a third type packet and forwarding the third type packet, modifying a header of a second type packet to form a fourth type packet and forwarding the fourth type packet, modifying a header of a fifth type packet to form a sixth type packet or a seventh type packet and forwarding the sixth type packet or the seventh type packet;

a station equipped with a first network interface unit and a second network interface unit, wherein the first network interface unit is utilized for forwarding the first type packet to the access point and receiving the sixth type packet forwarded by the access point, and the second network interface unit is utilized for forwarding the second type packet to the access point and receiving the seventh type packet forwarded by the access point; and a remote host for receiving the third type packet and the fourth type packet forwarded by the access point, and forwarding the fifth type packet to the access point.

\* \* \* \* \*